United States Patent [19]

Bodycomb, Jr. et al.

[11] 4,241,505
[45] Dec. 30, 1980

[54] DUST SHROUD FOR PORTABLE CIRCULAR SAW

[75] Inventors: Frederick M. Bodycomb, Jr.; Glenn R. Bauman, both of Arapahoe, Colo.

[73] Assignee: Johns-Manville Corporation, Denver, Colo.

[21] Appl. No.: 40,615

[22] Filed: May 21, 1979

[51] Int. Cl.³ .......................... B27B 9/00; B27B 19/04
[52] U.S. Cl. ........................ 30/390; 83/100; 144/252 R
[58] Field of Search .................. 30/390, 391, 133; 51/273; 83/100; 144/252 R

[56] References Cited

U.S. PATENT DOCUMENTS

| Re. 20,687 | 4/1938 | Grozier | 83/100 |
|---|---|---|---|
| 3,119,602 | 1/1964 | Johnson | 144/252 R |
| 3,282,308 | 11/1966 | Sprague | 30/391 X |
| 3,882,598 | 5/1975 | Earle | 30/390 |
| 4,022,182 | 5/1977 | Lenkevich | 30/390 |
| 4,063,478 | 12/1977 | Stuy | 83/100 |

*Primary Examiner*—Jimmy C. Peters
*Attorney, Agent, or Firm*—Robert M. Krone; Joseph J. Kelly; James W. McClain

[57] ABSTRACT

A dust shroud for a portable circular saw is described comprising an upper blade housing, a lower blade housing, an external connecting link connecting the two and aligned with the saw blade, and flexible sealing means attached to the upper part of the lower blade housing. The thickness of the connecting link is not greater than the thickness of the saw blade and since the link is aligned with the saw blade it follows the saw blade through the kerf created by the blade in the worksheet. The upper blade housing is attached directly to the saw's motor housing and moves therewith while the lower blade housing is attached to the upper blade housing through the connecting link and is thus kept aligned with the upper housing as the saw cuts through the workpiece. The flexible sealing means keeps dust from escaping from the lower blade housing since it continuously conforms to irregularities in the surface of the workpiece. The total area of openings into the blade housings is minimized in order to keep the air velocity as great as possible within the housings. The air entry area provided by the flexible sealing means is also minimized consistent with drag forces created, so that the saw may be smoothly moved across the workpiece. Different embodiments of the sealing means are disclosed for use with flat workpieces or those with only small to moderate irregularities and with workpieces of more highly irregular surfaces, such as corrugated sheets. Both upper and lower housings are connected through exhaust ducts to vacuum sources such that dust generated by the saw blade is confined within the housings from which it is withdrawn and collected by the exhaust ducts and vacuum system. Extremely low airborne dust counts in the vicinity of the saw in service are obtained with this device.

15 Claims, 4 Drawing Figures

DUST SHROUD FOR PORTABLE CIRCULAR SAW

TECHNICAL FIELD

The invention herein relates to dust shrouds for portable power hand tools. More particularly, it relates to dust shrouds for portable circular saws.

BACKGROUND OF PRIOR ART

Portable circular saws, either pneumatically or electrically powered, are among the most common hand tools. They are used extensively by carpenters and many other tradesmen in a variety of industries such as building construction. They are also widely used by homeowners and other "do-it-yourselfers."

The use of a portable circular saw to cut materials such as wood, asbestos/cement, fiber board and the like generates large amounts of sawdust. This dust fills the atmosphere surrounding the workplace and settles on surfaces at the workplace. The airborne dust represents a health hazard when breathed in by the user of the saw and other people in the immediate vicinity. Settling of the dust on nearby equipment and other structures necessitates frequency cleaning of those devices. Settled dust which works into bearings and other critical parts of such devices has a detrimental effect on their operation and length of service life. Since it is impossible to prevent generation of sawdust from the operation of a portable circular saw, it is very desirable to provide means to capture that dust as soon as possible after its generation and convey it to appropriate enclosed collection and/or disposal equipment.

The portable circular saw presents a particularly difficult problem in dust capture. Unlike other saws such as rotary table saws (see, e.g., U.S. Pat. No. 4,063,478) or overhead arm radial saws which operate in a single fixed location, the very nature of the use of the portable circular saw requires that it frequently be moved from one work location to another. This precludes its being enclosed in a conventional dust capture enclosure. It also requires that any dust capture device must be fully portable and capable of the same freedom of movement as the saw itself. Further, because portable circular saws are frequently used in locations where the user has only one hand free to operate the saw, any dust collection device must also be capable of operating directly in conjunction with the saw such that the user does not need to handle the dust collection device independently.

One approach to dust collection for a portable circular saw is embodied in a commercial saw produced in Germany. This saw utilizes upper and lower blade housings which are ducted to a collection system. The housings are connected by an adjustable "splitting wedge" or "riving knife" mounted in the interior of each of the housings. While this saw represents a distinct improvement in dust collection over many other units (such as that shown in U.S. Pat. No. 3,882,598, which requires use of a collection table below the saw), tests have shown it to still emit approximately twice the dust permitted by OSHA regulations. The internal location of the adjustable "splitting wedge" makes adjustment of the housings spacing difficult, which encourages users to use a wider than necessary spacing, with attendant excess dust emissions, rather than take the trouble to disassemble the saw for adjustment. The internal "splitting wedge" also serves as a dust trap and tends to cause dust clogging of the housings, and the trapped dust also complicates spacing adjustments and causes loose dust problems when the housings are disassembled for spacing adjustment.

This commercial German saw also is constructed such that air is drawn through the motor housing before it enters the dust collection housings. This serves to reduce the quantity of air effectively available to sweep dust from the vicinity of the saw blade and to prevent dust from escaping from the saw blade apertures in the upper and lower housing. The net result is that the dust collection efficiency of this saw is low.

Consequently, it would be desirable to have a shroud for a portable circular saw which would be highly effective for dust collection (i.e., would readily meet maximum dust emission regulations, such as those of OSHA), while yet being easily handled by the saw user, readily and quickly adjusted for proper housing spacing, and also capable of continuous adjustment to minor irregularities in the surface of the workpiece, thus insuring that maximum dust collection will be continuously maintained.

BRIEF SUMMARY OF THE INVENTION

The invention herein comprises a dust shroud for a portable circular saw, the saw having a circular blade mounted on a rotatable shaft, a motor to rotate the shaft and a motor housing surrounding the motor and through one side of which said shaft projects, with the blade being mounted on the shaft at a position outside the motor housing. The dust shroud of this invention comprises (a) an upper blade housing having sides and a top enclosing an open upper interior chamber adapted to surround the greater portion of the blade while permitting free rotation of the blade within the upper chamber, and a bottom which has a work engaging surface and an opening in said surface through which the lesser portion of the blade can project, with the upper blade housing being attached to the motor housing of said saw; (b) a lower blade housing having sides and a bottom enclosing an open lower interior chamber adapted to surround at least a part of the lesser portion of the blade while permitting free rotation of the blade within the lower chamber, the lower blade housing having a top which has a work engaging surface and which has an opening in said surface through which the lesser portion of the blade can project, the lower blade housing being attached only to the upper blade housing and spaced therefrom by means of an external attachment link, the amount of spacing being generally equal to the width of the workpiece engaged by the saw; (c) each of the upper and lower blade housings having incorporated therein a dust removal conduit having one end communicating with the interior chamber of the housing and the other end adapted to be removably connected to a source of vacuum and a dust collection chamber such that dust generated within the interior chamber can be removed therefrom and conveyed to the collection chamber; (d) the attachment link joining the exteriors of the upper blade housing and the lower blade housing, with the link being aligned in the plane of the blade but spaced therefrom and disposed behind the blade with respect to the blade's direction of travel, the link having a thickness not greater than the thickness of the blade such that as the blade passes through the workpiece the link will follow the blade in the kerf created by the blade, and the link having a length sufficient to allow the housings to be spaced apart by a distance at least equal to the width of the workpiece; and (e) flexible sealing means attached to the top portion of the lower blade housing and adapted to be in contact with the workpiece on either side of the opening in the top of the lower blade housing, such that the flexible sealing means will generally conform to the surface shape of the workpiece.

In a preferred embodiment the attachment link is slidably joined to the upper blade housing such that the space between the upper and lower blade housings can be adjusted to compensate for different widths of workpieces.

In a preferred embodiment the upper blade housing contains no significant apertures other than the opening in the work engaging surface for the blade, the opening for the dust removal conduit and an opening to allow the shaft to project from the motor housing into the upper housing, and the lower blade housing contains no significant apertures other than the opening in the work engaging surface for the blade and the opening for the dust removal conduit. Preferrably also the flexible sealing means are adapted so as to provide a minimum open area consistent with avoidance of creation of excessive drag forces on the saw.

In some embodiments the sealing means comprises unitary strips parallel to the workpiece surface for use with flat workpieces or those of slight or moderate curvature, or the sealing means comprises a plurality of narrow parallel strips abutting or overlapping and being at an angle to the workpiece surface for use with highly curved or irregular workpieces.

DETAILED DESCRIPTION OF INVENTION

The invention herein is best understood by reference to the drawings.

Figure 1:
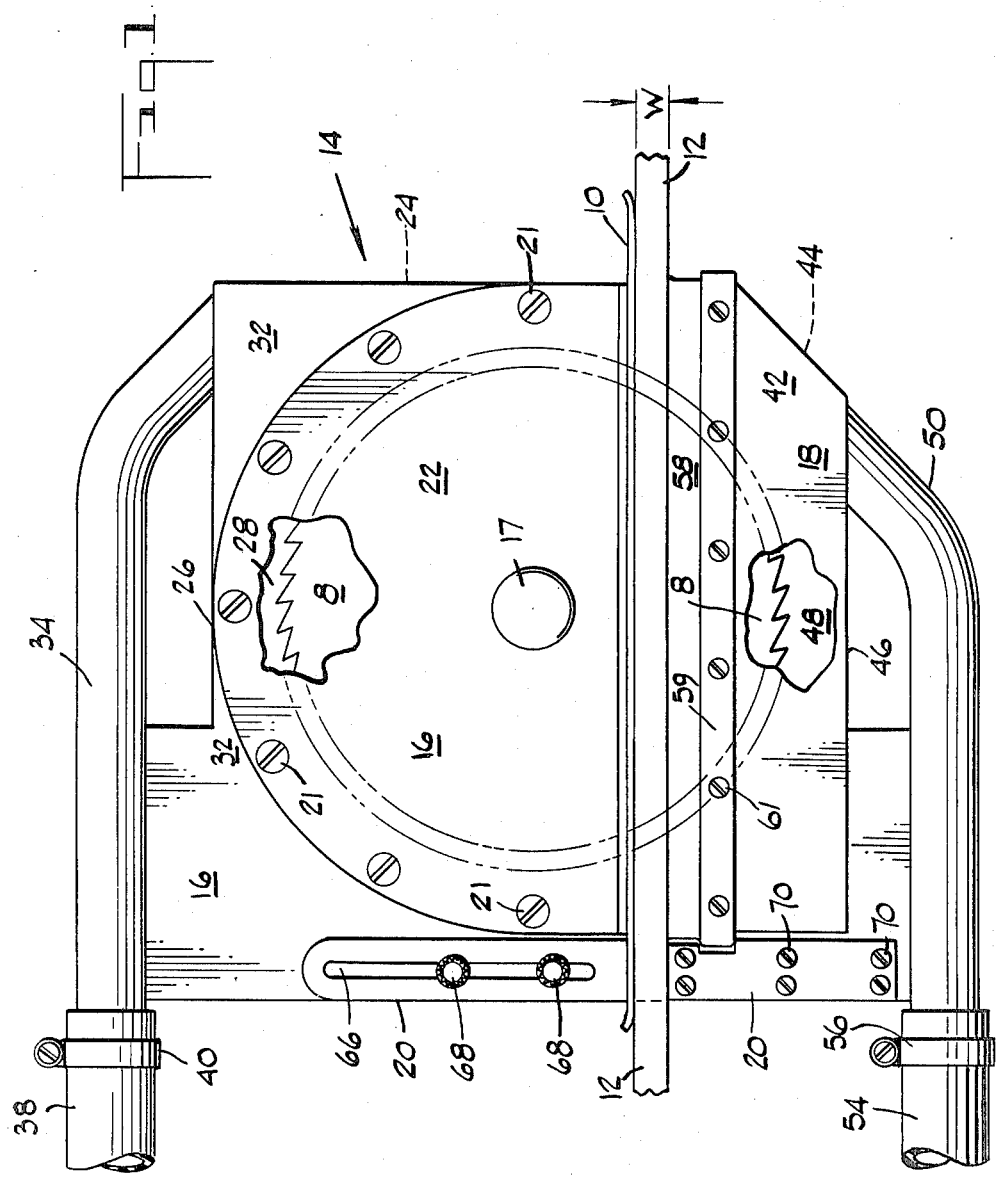
FIG. 1 is a side elevation view of a dust shroud of the present invention mounted on a saw to be used for cutting a flat workpiece.
Figure 2:
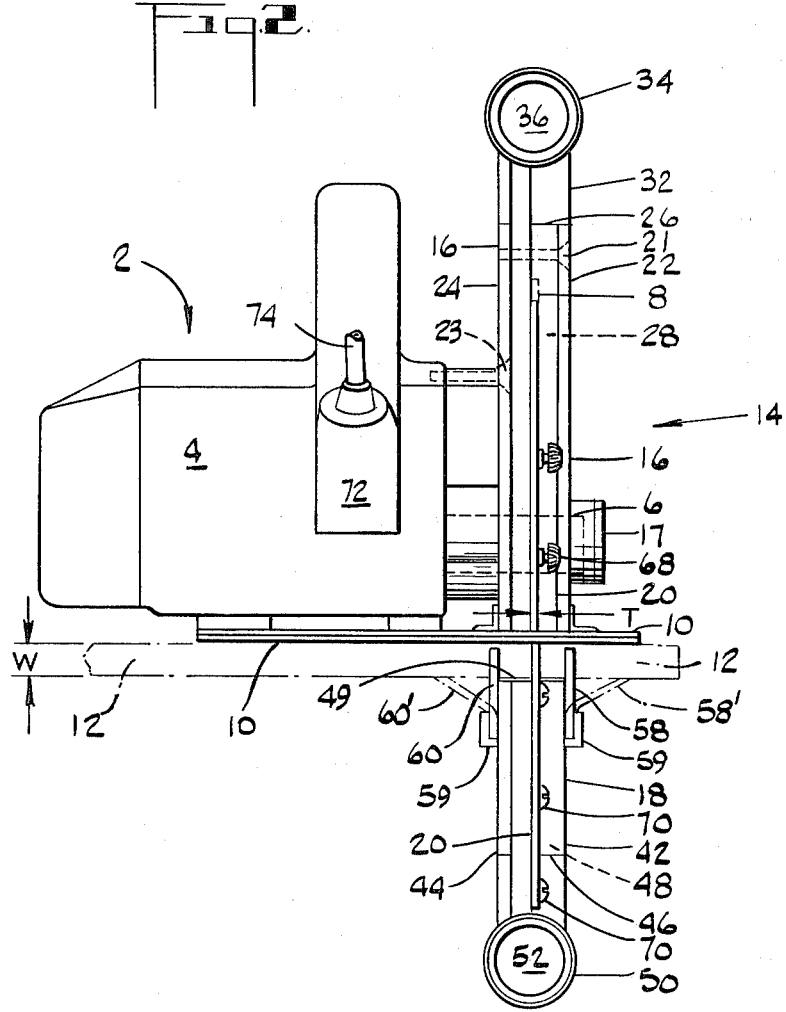
FIG. 2 is an elevation view of the dust shroud of FIG. 1 shown from the rear.

FIGS. 1 and 2 illustrate the same embodiment of the device shown respectively in side and rear views. Conventional portable circular saw 2 contains a motor (not shown) inside motor housing 4. Motor 4 drives shaft 6 by conventional means. Circular saw blade 8 is mounted on shaft 6, by conventional mounting devices such as a threaded hub with a locking nut (not shown), and turns therewith. Circular saw blade 8 is normally removable, and any of a wide variety of different blades may be used interchangeably for sawing different types of material. Beneath motor housing 4 and attached thereto is a base plate 10 which engages the surface of the work being cut. Base plate 10 supports the saw 2 on the workpiece 12, and has an opening therethrough 30 for the saw blade 8 to project through. In FIGS. 1 and 2 the workpiece 12 is shown as a flat sheet. As will be discussed below in conjunction with FIG. 4, the work may also have an irregular and/or curved surface. Thus far the saw and its structure are conventional, with the exception that the retracting guard hood for the saw blade which is a feature of standard circular saws is not present.

In place of the conventional guard hood is the dust shroud device 14 of the present invention. This device consists of several principal elements: an upper blade housing, a lower blade housing, dust removal conduits incorporated in each housing and communicating with dust exhaust and collection means, an external attachment link connecting the two housings, and self-adjusting dust sealing means attached to the lower housing. Each of these components will be discussed in detail below.

Figure 3:
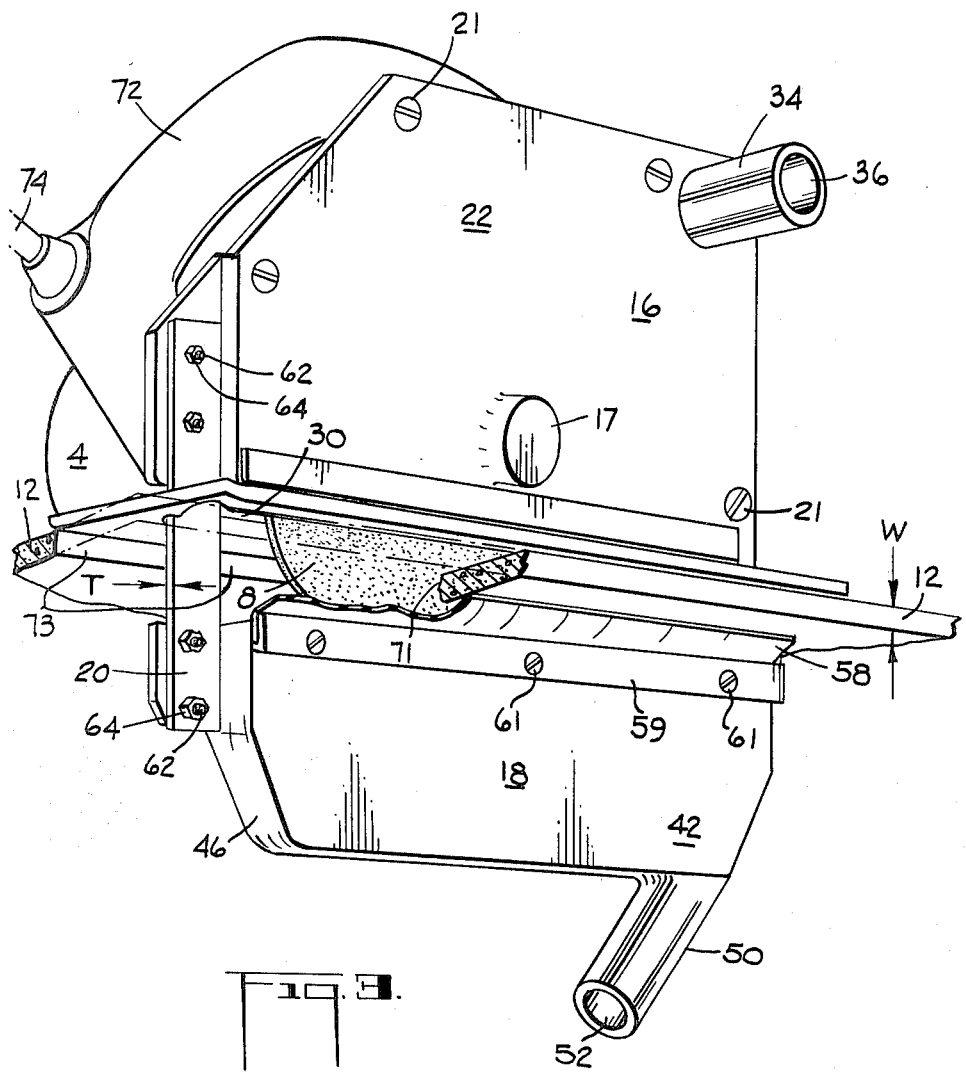
FIG. 3 is a perspective view partially in section showing another embodiment of the dust shroud of this invention mounted on a saw for use in cutting a flat workpiece.

The upper blade housing 16 consists of two sides 22 and 24 connected by a transverse member 26 (which will for convenience also be referred to as a "side"). The sides 22, 24 and 26 as joined form a hollow chamber 28 which extends down to base plate 10, is open at the bottom and in which the upper portion of blade 8 is free to rotate. Because shaft 6 is also enclosed within chamber 28, the greater portion of blade 8 rotates within the chamber 28. The smaller portion of the blade 8 projects out of the bottom of chamber 28 through the opening 30 in the base plate 10, as best shown in FIG. 3. Hub 17 allows space for the shaft 6 and the blade mounting members to extend past blade 8. The side 22 is made removable by use of mounting screws 21 to permit access to blade 8. Screws 23 mounted on inside wall 24 are used to attach the shroud 14 to the motor housing 4.

Figure 4:
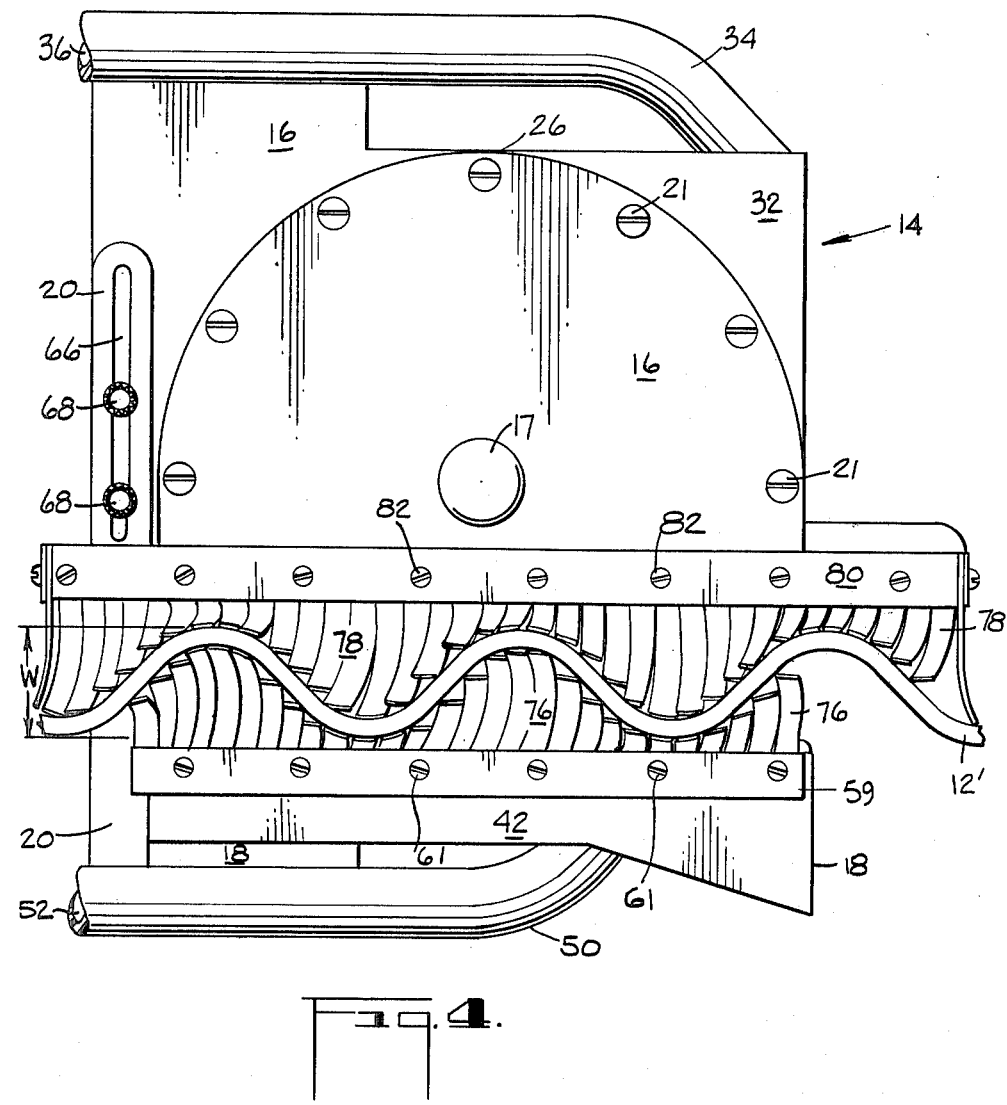
FIG. 4 is a side elevation view of another embodiment of a dust shroud of this invention for use in cutting workpieces of irregular surface.

The exact configuration of the upper housing 16 is not critical, as long as it provides ample space for the blade to rotate and also provides sufficient space within the chamber 28 for the dust generated by the blade to move freely to the outlet duct. Excessive interior space is not desirable, however, because of the greater volume of air which must be moved by the exhaust and collection system to collect the same amount of generated saw dust. FIGS. 1, 2 and 4 show an embodiment in which the upper housing has a generally semicircular configuration confirming to the shape of the blade with generally rectangular extensions 32 supporting the outlet duct 34 and providing for dust flow within the chamber to the outlet duct. The embodiment in FIG. 3 is more squared off and does not conform to the blade shape but still functions in an identical manner.

Mounted at the top of the upper housing 16 is outlet duct 34. The interior 36 of duct 34 communicates directly with the interior of chamber 28 so that dust created by the action of saw blade 8 within the chamber 28 can be exhausted through duct 34. In the embodiment shown in FIG. 1 duct 34 extends to the rear of upper housing 16 and is essentially parallel to the blade 8 so that the dust exhaust is to the rear of the saw. Attached to the end of duct 34 is hose 38 which is secured by hose clamp 40. Hose 38 is attached to a suction fan or other source of vacuum so that the dust generated within chamber 28 is rapidly and completely exhausted through duct 34 and hose 38 to a dust collection chamber (not shown).

The lower housing 18 is basically similar to the upper housing 16 but is reduced in dimensions since it encloses a smaller portion of saw blade 8. Lower housing 18 is formed from sides 42 and 44 and transverse member ("side") 46 which form the hollow interior 48 of the housing 18. As with the interior 28 of upper housing 16, the interior 48 of lower housing 18 is open adjacent to the workpiece 12 (i.e., the top of the lower chamber 48 comprises an opening 49) so that the blade 8 can move freely. Also, as with the upper chamber 16, the specific configuration of lower chamber 18 is not critical, as long as the blade 8 rotates freely and the dust generated within the chamber 48 can be freely ducted through the exhaust duct communicating therewith. Three different suitable configurations are shown in FIGS. 1, 3 and 4 respectively.

Attached to lower housing 18 is exhaust duct 50 whose interior 52 communicates directly with the interior of chamber 48. In the configuration shown in FIG. 1 the duct 50 extends rearwardly parallel to duct 34 and at its rearward end is attached to hose 54 by hose clamp 56. Hose 54 is attached to a suction fan or other source of vacuum (not shown) which permits exhausting of the dust from lower chamber 48 through duct 50 to a collection chamber (not shown). Conveniently, the same source of vacuum and collection chamber serves both the upper and lower housings.

The particular amount of vacuum will of course depend on the size of the tool being used, the quantity and density of dust expected and the particular configuration of the shroud. This can readily be determined by one skilled in the art. If a particular amount of vacuum turns out to be insufficient, additional vacuum can readily be obtained by such means as running the suction fan at higher speed and/or adding additional suction fans to the vacuum line.

An important element in the shroud of this invention are gaskets 58 and 60, which are mounted on lower housing 18 along the upper parts of sides 42 and 44 respectively. These gaskets are secured to the housing sides by channels 59 and screws 61. When the saw is in service cutting a workpiece 12 the gaskets 58 and 60 flex outward as shown at 58' and 60' to form a dust seal to prevent dust from escaping from the top of the lower chamber 48. This flexural ability also enables the shroud to conform to the surface shape of the workpiece, and assures that maximum dust collection will be continuously maintained. In the embodiment shown in FIGS. 1, 2 and 3, in which the workpiece 12 is essentially flat, the gaskets 58 and 60 are each formed of a unitary strip of an elastomeric material, such as rubber. Alternatively, shorter strips abutted to each other at their ends could be used, which would enhance the device's ability to conform to moderate surface irregularity or curvature. (Another configuration of gaskets 58 and 60 for use with highly curved or irregular workpieces, such as those which are corrugated, is shown in FIG. 4.)

The gaskets are configured and sized so as to provide a small area through which air can enter the upper and lower housings through the blade openings 30 and 49. The smaller the available area for air entry, the higher the velocity of air within the housings and the more efficient the degree of dust pickup by the air for conveyance to the outlet ducts. The sizing of the air entry area is limited, however, by the fact that smaller areas also create more suction drag on the saw when the saw moves across the workpiece. Thus it is preferred to use the smallest area consistent with not creating an excessive amount of drag that would unduly interfere with the workman's ability to move the saw smoothly across the workpiece. For each type and size of saw, amount of vacuum, type and size of gaskets, and nature of workpiece the optimum entry area will be different, but one skilled in the art can readily determine the most suitable area for any particular set of circumstances.

In this regard, it is preferred to minimize the total opening area into each of the housings. As the total opening area is increased, the air velocity through the housings is decreased (since the outlet air volume is normally constant for a given outlet conduit size and vacuum source) and thus the ability of the air movement to sweep dust to the outlet conduits is substantially reduced. Preferably only the openings absolutely necessary are contained in the housings. For the upper blade housing 16, there are the blade opening 30, the opening into the outlet conduit interior 36 and the opening for the motor shaft 6. The opening for the motor shaft should if possible be sealed with a rotary shaft seal around the motor shaft. The various walls of the housing are closed by welds and/or screws such as 21. For the lower housing the openings will be opening 49 and the opening into the interior 52 of outlet duct 50.

Another important component in the structure of the present invention is external connecting link 20 which joins the exterior of upper housing 16 to the exterior of lower housing 18 and also provides support for lower housing 18 since the latter is not otherwise connected to the saw. Connecting link 20 is generally in the form of a thin, flat, elongated strip whose thickness (designated T) in the region where it spans the space between the upper housing 16 and lower housing 18 is not greater than, and preferably slightly less than, the thickness of the sawblade 8. The connecting link 20 is also disposed so that it is in direct alignment with the blade 8. This permits the connecting link 20 to follow the sawblade 8 directly in the kerf created by the cutting action of the sawblade. Thus as the saw moves through the workpiece connecting link 20 causes the lower housing 18 to follow the upper housing and remain aligned therewith such that dust is continuously collected from the saw throughout the entire cutting operation.

Preferably the connecting link 20 has a uniform thickness T throughout its entire length for ease in fabrication. However, it is possible to have greater thicknesses at the extremities of the link 20 if desired, as where a greater thickness for attaching mounting screws or nuts might be desired. It will be immediately understood, however, that the adjustments described below to allow the upper housing 16 and lower housing 18 to be moved relative to each other to accommodate different thicknesses of the work 12 will be limited in such cases since thicknesses of connecting link 20 greater than the thickness of the saw blade will not be able to travel through the saw kerf.

The connecting link 20 may be fixedly attached to either or both of the upper housing 16 or lower housing 18. In FIG. 3 such fixed attachment is accomplished by use of the bolts 62 and nuts 64 projecting through aligned holes in the housings and connecting link. This fixed attachment at both ends serves well when a significant number of pieces of sheet, all of essentially the same thickness, are to be cut. The thicknesses can vary somewhat and still be cut by a fixed link embodiment, because the gaskets 58 and 60 will flex to provide a degree of size variation. Preferably, however, at least one end of the connecting link 20 is adjustably attached to the respective housing of the saw, as exemplified in FIG. 1 where the upper portion of the connecting link 20 is shown slidably mounted to upper housing 16. This slidable mounting is effected by incorporating slot 66 into link 20 and using thumb screws 68 penetrating through slot 66 to secure the link 20 to the upper housing 16. Use of a slidable mounting as shown in FIG. 1 is preferred because it allows a wide variety of adjustment of the spacing between the upper and lower housings.

Other types of adjustable mountings which could be used would include a series of mounting holes in link 20 which would allow thumb screws to be placed at differing positions. Similarly, the lower end of link 20 could be made adjustable in its attachment to lower housing 18. It is preferred, however, that the lower portion of link 20 be fixedly attached to lower housing 18 as by screws 70 in order to minimize the tendency of lower housing 18 to drop away from the workpiece by its own weight. The spacing to be used will of course depend on the thickness of the workpiece and its degree of surface irregularity. For the purposes of this invention, the workpiece "width" designated W will be referred to for a determination of the appropriate housing spacing. In most cases the spacing will be slightly greater than the maximum width, such that variations in workpiece surface shape can be easily accommodated and the saw can move easily across the workpiece.

The external placement of connecting link 20 adds significantly to the effectiveness of the shroud of this invention. The external placement permits the interior space with each of the housings 16 and 18 to be optimized for air flow and dust collection, without requiring the provision of extra space for an internal connecting member. External placement also eliminates the "dust-trap" effect of the connecting member. Also, the external location of connecting link 20 makes adjustment of the housing spacing easy and fast for the saw user, and makes it much more likely that the user will always adjust the shroud to the correct spacing than if the user had to disassemble the shroud to adjust an internal member each time a spacing change was indicated. Finally, the external location also improves the safety of the device. The vibration of the saw in use will frequently result in causing the adjusting screws holding a connecting member (either internal or external) to work loose. The user is much more likely to retighten external screws at the first sign of loosening, however, and therefore keep the saw operating most safely, as compared to a saw utilizing hard-to-get-at internal screws on an internal connecting member.

The effect of the connecting link 20 following the blade 8 through the saw kerf is most graphically shown in FIG. 3. In this view the kerf 71 formed by the cut edge 73 of the workpiece 12 is indicated and the path of the link 20 behind the blade 8 is clearly visible. Also best shown in FIG. 3 is the handle 72 and and electric cord 74 which provide power for the electric motor of saw 2. Alternatively, of course, the saw can be powered pneumatically, in which case an air pressure line would replace cord 74. FIG. 3 also illustrates an alternative placement of the outlet ducts 34 and 50 (the attachment to hoses 38 and 54 not being shown in this view).

FIG. 4 illustrates an embodiment of the present invention useful for collecting dust from the cutting of a highly irregular or curved workpiece 12', here illustrated as a corrugated sheet. In this case the gaskets 58 and 60 are replaced by a plurality of thin flexible strips 76 attached to the lower housing by channels 59 and screws 61 and an opposing plurality of similar strips 78 attached to upper housing 16 by channels 80 and screws 81. These flexible strips 76 and 78 (which are preferably all of essentially the same length) alternately flex outward and straighten as the saw passes over the corrugations of the workpiece 12'. The strips 76 and 78 are shown aligned generally perpendicular to the worksheet, but they can also be aligned at lesser angles, and the upper strips 78 can be aligned at an angle different from the alignment angle of the lower strips 76, if desired. The closely fitting strips 76 and 78 (which can be made to overlap if desired) prevent any significant escape of dust from the sides of the saw, allowing essentially all the dust to be retained inside the upper housing 16 and lower housing 18 from which it can be removed through the outlet ducts 34 and 50 as previously described. The strips 76 and 78 may be made of any convenient flexible material, such as rubber or another elastomeric material. Thin flexible strips of metal could also be used. Other possible embodiments include spring-loaded overlapping leaves of thin metal, plastic or similar sheet material, or a plurality of parallel adjacent verical rods or pins, which will ride up and down to conform to the surface curvatures. Of course, this embodiment with strips of greater or lesser widths could also be used for workpieces of slight or moderate irregularity.

The following examples will illustrate the effectiveness of the dust shroud of the present invention. An enclosed box with one side made of glass was constructed with gloves mounted in the sides to enable an operator outside the box to manipulate tools inside the box. At one end of the box an air inlet was provided and near the other end of the box an air sampler containing a membrane filter was mounted ahead of an exhaust fan. Means were provided to determine the volume of air passed through the air sampler per unit of time. Standard samples of asbestos/cement sheet material to be cut were provided. In each test a portable circular saw inside the box was used to make a cut of a predetermined number of linear inches into a standard sample while air was passed through the box. The amount of dust collected by the air sampler plus that which accumulated at the bottom of the box was measured. Thus the amount of dust escaping from the tool per unit of air passing through the chamnber could be determined. In these experiments (except where noted) the saw used was a commercial $8\frac{1}{4}''$ circular saw manufactured by Rockwell International Company and designated Model 680. Four different tests were made with this saw, in each of which 18 linear inches per minute of asbestos/cement material were cut utilizing a "New England" brand 8" silicon carbide masonry blade. In the first test the saw was used in its commercially obtained condition, with no dust shroud but with its commercial blade guard attached. In a 15 minute test the saw cut a total of 325 grams of material but created a highly dusty condition within the box, yielding a dust count of 21.0 dust fibers per cubic centimeter ("f/cc") of air. For comparison purposes it will be noted that the fiber standard for airborne asbestos dust fibers as set forth by the Occupational Safety and Health Administration is a maximum of 2.0 f/cc. In the second test the same saw was used with a commercial dust shroud made by Cape Universal Building Products, Ltd. This shroud consists of a light flexible plastic cover which fits over the blade guard above the board being cut. In order to obtain a relatively low dust count, it was necessary to capture the dust generated by the lower half of the saw blade, which is not covered by the saw. This was accomplished by use of a collection box under the workpiece or by placing a backing board under the workpiece and adjusting the depth of cut of the saw blade so that the backing board was grooved but not cut through. This shroud was able to attain an airborne dust count of 1.2 f/cc when used with such added capture means below the workpiece. A considerable amount of desposted (not airborne) dust was accumulated, however. Since a circular saw is frequently used in circumstances where it is difficult or impractical to provide a collection box, or a backing board and in many cases workmen are reluctant to take the time to make such a box, or use a backing board, the commercial Cape shroud was deemed entirely unsatisfactory because of the high amount of airborne dust that would be generated in the absence of the specially provided capture means.

In the third test a standard dust collection open hood was placed over the work area where the saw cutting was taking place. Such hoods operate on the principle of collecting dust particles in their flight path. In each of two tests an average of 337 grams of material was pulverized by the saw in a 15 minute period. Large amounts of airborne dust were generated amounting to 23.7 f/cc in the first test and 27.2 f/cc in the second test.

In the fourth test a shroud having the configuration shown in FIG. 3 was used. In each of three 15 minute tests an average of 326 grams of material was pulverized. In the first test using a minimum vacuum (1.0 inches of mercury) a dust count of 2.8 f/cc was obtained. The amount of vacuum was increased for the second and third tests to levels of 2.5 and 3.0 inches of mercury respectively. These two tests resulted in dust counts of 0.4 f/cc and 0.0 f/cc respectively.

For comparison purposes a fifth experimental run was made using the commercial German shrouded saw described above. With the shroud in place and operated according to the manufacturer's directions, the saw was found to produce an average of 4.5 f/cc of airborne dust during a forty minute period; a volume which is 125% greater than the allowable OSHA maximum. It will immediately be evident that the dust shroud of the present invention is a highly effective dust collection system for use with standard portable circular saws, and much superior to prior art shrouded saws. The unit is easily mounted on the saw and readily handled by the average workman, while yet providing almost complete collection of dust generated when adequate vacuum is applied.

STATEMENT OF INDUSTRIAL APPLICATION

The dust shroud of the present invention is useful with all types of portable circular saws. Such saws find use in a wide variety of industries, including building construction, woodworking industries and manufacturing concerns where finished articles are fabricated from sheet materials.

We claim:

1. A dust shroud for a portable circular saw, the saw having a circular blade mounted on a portable shaft, a motor to rotate the shaft, and a motor housing surrounding said motor and through one side of which said shaft projects, with said blade being mounted on said shaft at a position outside said motor housing; said shroud comprising:
   (a) an upper blade housing having sides and a top enclosing an open upper interior chamber adapted to surround the greater portion of said blade while permitting free rotation of said blade within said upper chamber, and a bottom which has a work engaging surface and an opening in said surface through which the lesser portion of said blade can project, with said upper blade housing being attached to said motor housing of said saw;
   (b) a lower blade housing having sides and a bottom enclosing an open lower interior chamber adapted to surround at least a part of the lesser portion of said blade while permitting free rotation of said blade within said lower chamber, said lower blade housing having a top which has a work engaging surface and which has an opening in said surface through which said lesser portion of said blade can project, said lower blade housing being attached only to said upper blade housing and spaced therefrom by means of an external attachment link, the amount of spacing being generally equal to the width of the workpiece engaged by said saw;
   (c) each of said upper and lower blade housings having incorporated therein a dust removal conduit having one end communicating with said interior chamber of said housing and the other end adapted to be removably connected to a source of vacuum and a dust collection chamber such that dust generated within said interior chamber can be removed therefrom and conveyed to said collection chamber;
   (d) said attachment link joining the exteriors of said upper blade housing and said lower blade housing, with said link being aligned in the plane of said blade but spaced therefrom and disposed behind said blade with respect to said blade's direction of travel, said link having a thickness not greater than the thickness of said blade such that as the blade passes through the workpiece said link will follow said blade in the kerf created by said blade, and said link having a length sufficient to allow said housings to be spaced apart by a distance at least equal to the width of said workpiece; and
   (e) flexible sealing means attached to the top portion of said lower blade housing and adapted to be in contact with said workpiece on either side of said opening in the top of said lower blade housing, such that said flexible sealing means will generally conform to the surface shape of said workpiece.

2. A dust shroud as in claim 1 wherein said lower and upper blade housings each contain only the minimum number of apertures necessary for operation.

3. A dust shroud as in claim 2 wherein said apertures consist of said openings in said work engaging surfaces, openings from the interior chambers of said housings to the interiors of said dust removal conduits, and the opening through which said shaft projects into said upper blade housing.

4. A dust shroud as in claim 1 wherein said flexible sealing means are adapted to provide the minimum air entry area into said upper and lower blade housings consistent with prevention of creation of excessive drag on said saw as it moves across said workpiece.

5. A dust shroud as in claim 2 wherein said flexible sealing means are adapted to provide the minimum air entry area into said upper and lower blade housings consistent with prevention of creation of excessive drag on said saw as it moves across said workpiece.

6. A dust shroud as in claim 3 wherein said flexible sealing means are adapted too provide the minimum air entry area into said upper and lower blade housings consistent with prevention of creation of excessive drag on said saw as it moves across said workpiece.

7. A dust shroud as in claims 1, 2 or 3 wherein said link is adjustably attached to at least one of said housings such that the spacing between said housings can be varied.

8. A dust shroud as in claim 7 wherein said link is slidably attached to said upper blade housing.

9. A dust shroud as in claim 7 wherein said flexible sealing means comprises unitary flexible strips on each side of said lower blade housing and aligned generally parallel to said workpiece.

10. A dust shroud as in claim 7 wherein said flexible sealing means comprises a plurality of adjacent movable members which can move individually to provide essentially continuous conformation to the surface of said workpiece.

11. A dust shroud as in claim 10 wherein said flexible sealing means comprises a plurality of narrow flexible strips on each side of said upper and lower blade housings and aligned at an angle to said workpiece.

12. A dust shroud as in claim 11 wherein said strips are aligned generally perpendicular to said workpiece.

13. A dust shroud as in claim 7 wherein at least one side of said upper blade housing is removable to permit access to said blade within said housing.

14. A dust shroud as in claim 1 wherein said flexible sealing means comprises unitary flexible strips on each side of said lower blade housing and aligned generally parallel to said workpiece.

15. A dust shroud as in claim 1 wherein said flexible sealing means comprises a plurality of adjacent movable members which can move individually to provide essentially continuous conformation to the surface of said workpiece.

* * * * *

Dedication 4,241,505.—*Frederick M. Bodycomb, Jr.,* and *Glenn R. Bauman,* Arapahoe, Colo. DUST SHROUD FOR PORTABLE CIRCULAR SAW. Patent dated Dec. 30, 1980. Dedication filed July 19, 1982, by the assignee, *Johns-Manville Corp.*

Hereby dedicates to the Public the entire remaining term of said patent.
[*Official Gazette November 16, 1982.*]